May 9, 1950 G. M. CRIGER 2,506,779
LOOSE FRUIT LOWERATOR
Filed June 21, 1947 2 Sheets-Sheet 2
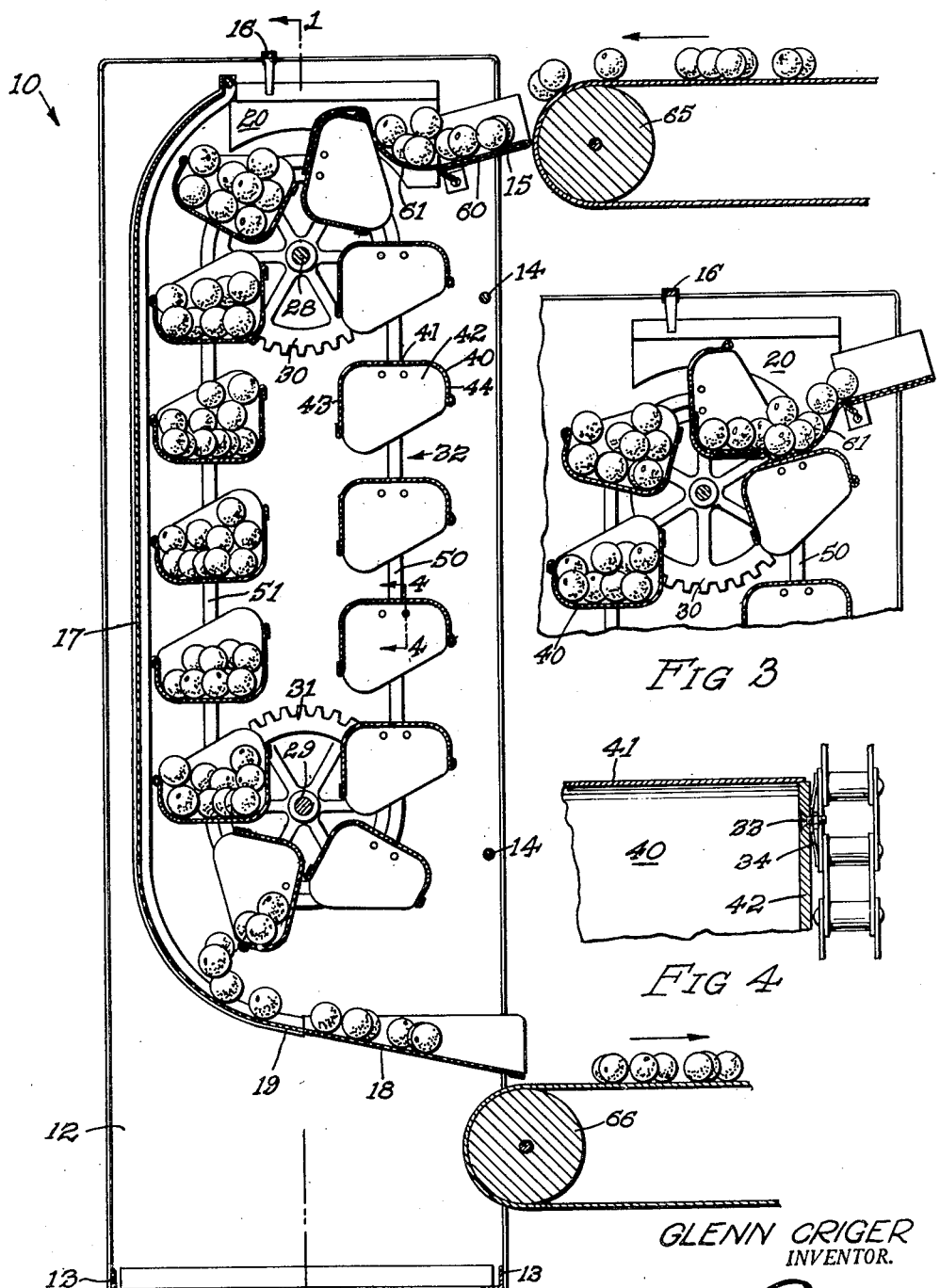
FIG 2
FIG 3
FIG 4
GLENN CRIGER
INVENTOR.
BY 

Patented May 9, 1950

2,506,779

UNITED STATES PATENT OFFICE 2,506,779

LOOSE FRUIT LOWERATOR

Glenn M. Criger, Riverside, Calif., assignor to Food Machinery and Chemical Corporation, a corporation of Delaware Application June 21, 1947, Serial No. 756,116

4 Claims. (Cl. 198—52)

1

This invention relates to bulk material handling and particularly to a device for lowering bulk material from one level to a level therebelow.

It is an object of the invention to provide a lowerator which will occupy a relatively small plan area.

It is another object of the invention to provide such a lowerator which will be very gentle on the product handled so as to be available for use in handling fresh fruits and vegetables being prepared for shipment to market.

The manner of accomplishing the foregoing objects as well as further objects and advantages will be made manifest in the following description taken in connection with the accompanying drawings in which:

Fig. 2 is a vertical sectional view taken on the line 2—2 of Fig. 1 and illustrating the lowerator of the invention in a given phase of the operation of delivering fruit to one of the buckets thereof.

Fig. 3 is a fragmentary view similar to the upper position of Fig. 2 and illustrating a successive phase in the delivery of fruit to said bucket.

Fig. 4 is an enlarged detailed sectional view taken on the line 4—4 of Fig. 2 and illustrating the manner in which the buckets of the invention are connected to the endless chains thereof.

Figure 1:
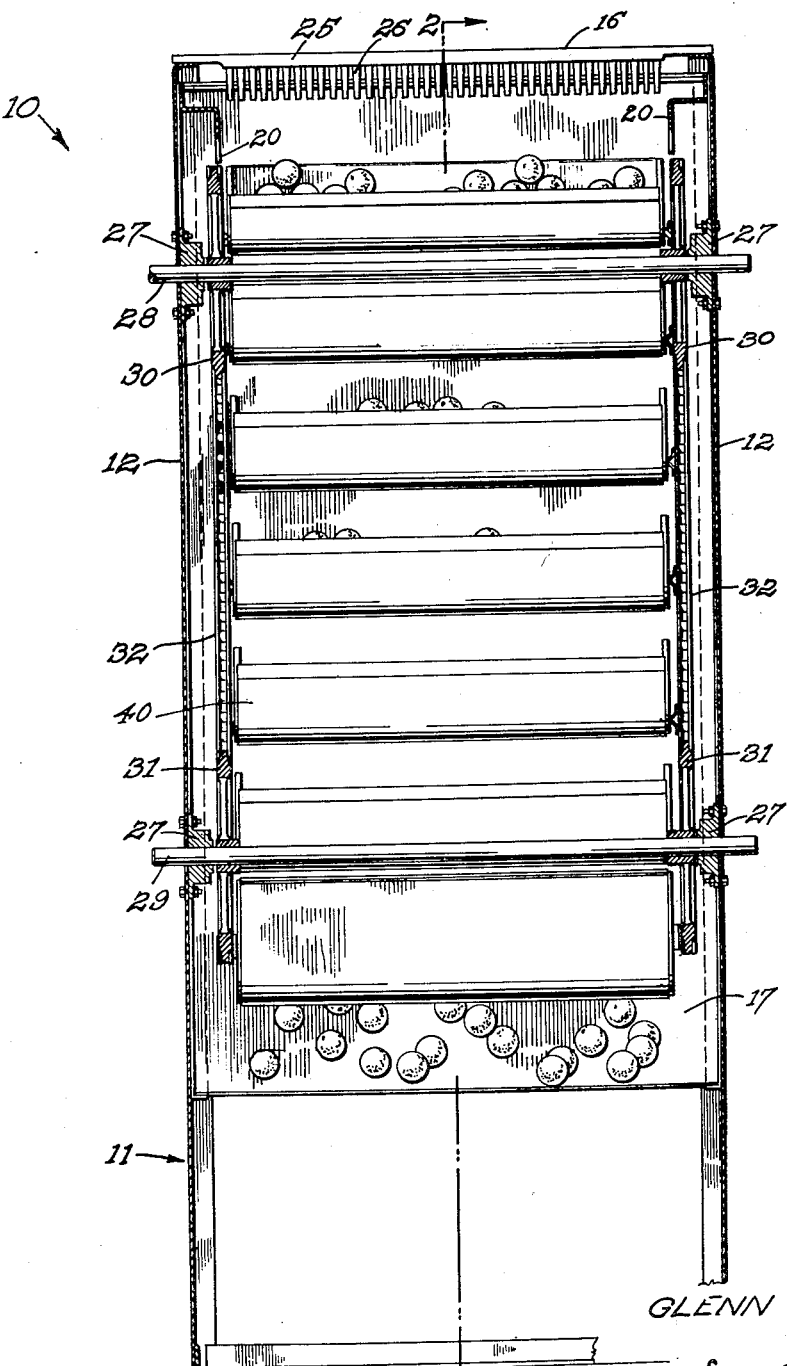
Fig. 1 is a vertical sectional view taken on the line 1—1 of Fig. 2 and showing a preferred embodiment of the invention.

Referring specifically to the drawings, a lowerator 10 embodying the invention is shown therein, this including a frame 11 having side walls 12 which are connected by angle irons 13, spacer bars 14, a delivery board 15, a material deflector 16, and a back wall 17, the upper and lower ends of which are curved as shown in Fig. 2, the curved lower end of this having an extension 18 which unites therewith to form a discharge chute 19.

The material deflector 16 includes a bar 25 on which is provided a series of closely spaced rubber fingers 26 extending downwardly therefrom as shown in Fig. 1.

Provided on the inner face of the walls 12 are bearings 27 in which are journalled shafts 28 and 29, pairs of sprockets 30 and 31 being fixed respectively on these shafts. Trained about each vertically aligned pair of sprockets 30 and 31 is one of a series of endless chains 32. Secured as by bolts 33 at two spaced points to attachment brackets 34, provided at correspond-

2 ing opposite positions on the chains 32, are buckets 40, the latter comprising a series of closely and equally spaced buckets throughout the length of the chains 32.

Each bucket 40 has a bottom 41, ends 42 and inner and outer sides 43 and 44, the latter preferably having rolled edges to prevent injury to fruit handled by the lowerator 10.

The inner bucket side 43 is longer than the side 44, which is to say: higher than side 44 when the bucket 40 is disposed upright.

The chains 32, when trained about the sprockets 30 and 31, have rising and descending runs 50 and 51.

Covering the delivery board 15 and secured thereto is a rubber sheet 60 which hangs freely from the lower edge of the board 15 to provide a flexible flap 61. This flap is long enough to hang clear over one of the buckets 40 as the connection between this and the chains 32 approaches its zenith, that is, its upwardmost position on these chains.

Any suitable means such as a conveyor 65 may be provided to deliver fruit to the delivery board 15. For receiving material lowered to a lower level by the lowerator 10, a conveyor 66 is provided.

The shaft 28 is preferably connected with a light motor to rotate this shaft and cause the buckets 40 to travel along their path of motion as indicated in Fig. 2. The conveyors 65 and 66, of course, are power-driven so as to feed material to the lowerator and take this away therefrom at rates in harmony with the capacity of the lowerator.

Operation

The mode of operation of the lowerator 10 is well illustrated in Figs. 2 and 3. From these views it will be seen that the flap 61 operates to prevent fruit delivered over the delivery board 15 to the lowerator 10 from escaping downwardly and out through the gap between the delivery board and the bottom of a bucket 40 which is rising towards the delivery board while the bucket next in advance thereof is turning about the sprocket 30.

Another object of the flap 61 is to accomplish a gentle transfer of fruit from the delivery board 15 into the respective buckets as these turn about the shaft 28 at the upper end of their upward travel.

The flap 61 also performs the function of accumulating fruit delivered over the drop board 18 until substantially a bucket full rests on the delivery board and flap.

It also insures this fruit being placed in the uppermost bucket as the latter gradually assumes an upright position after the points of connection between the chains and this bucket start downwardly or at least move away from the zenith of their travel.

It is to be noted in Fig. 3 how, when the uppermost bucket swings from under the free end of the flap 61 so that the weight of the fruit on this drags it downwardly into the position in which it is shown in Fig. 3, the bottom of the next following bucket supports the flap 61 and accumulated fruit resting thereon, which have not already rolled into the bucket being loaded. The bottom of this following bucket continues to rise and starts turning to lift and give such an inclination to the flap 61 as to cause the fruit resting on the flap to roll into the bucket being loaded.

It is believed to be clearly shown in the drawings how this mode of operation effects the feeding of material to these buckets with a degree of gentleness making the lowerator 10 most useful in the handling of fruit being prepared for shipping to market where any injury to the fruit causes decay and substantial loss to the shipper.

When each bucket approaches the nadir or lowermost point in its path of travel, it turns with the chains 32 as clearly shown in Fig. 2 to dump the fruit or other material contained therein onto the discharge chute 19 from which the fruit rolls onto the conveyor 66 and is carried away.

From the foregoing it may be seen that the lowerator 10 provides a means for gently lowering loose material from a given elevation to any desired lower elevation in which the lowering means is embodied in a simple inexpensive device which occupies a space having a relatively small plan area.

While only a single embodiment of the invention is illustrated and described herein, it is to be understood that this is susceptible of many variations without departing from the spirit of the invention or the scope of the appended claims.

The claims are:

1. In combination: endless chain means; upper and lower sprocket means about which said endless chain means is trained to produce substantially vertical rising and descending runs of said chain means between said sprocket means; a series of buckets fixed on said chain means so as to face downwardly on said rising run and upwardly on said descending run, said buckets being spaced relatively closely together; a delivery board disposed close to the path of said buckets with its delivery edge located at a point where the latter are rising and turning at the upper end of their path of travel on said chain means; and a flexible transfer flap having an edge thereof held fixed whereby said flap trails from the delivery edge of said board, said flap being free to ride upon said buckets as they turn with said chain means at the upper end of their path of travel whereby loose material delivered over said delivery board rides on to said flap and the latter covers the gap between said delivery board and an approaching bucket to prevent the loss of said material through said gap.

2. A combination as in claim 1 in which the inner side of each of said buckets is higher than the outer side thereof when said buckets are descending and in which said buckets are fixed to links in said chain means midway between said sides.

3. A combination as in claim 1 in which said flap is of sufficient length to overlie each bucket when the connection between the latter and said chain means has reached its zenith and in which the bottom of the next following bucket is at that time disposed closely below the lower side of said uppermost bucket so that as said connection starts downward with said chain means, the bottom of the following bucket supports said flap and lifts the latter as said following bucket also starts to swing in its change of direction to propel the loose material resting on said flap into the uppermost bucket so that as said flap is pulled out from said first mentioned bucket, said material is gently deposited therein.

4. A combination as in claim 1 in which the inner side of each of said buckets is higher than the outer side thereof when said buckets are descending, in which said buckets are fixed to links in said chain means midway between said sides, and in which said flap is of sufficient length to overlie each bucket when the connection between the later and said chain means has reached its zenith and in which the bottom of the next following bucket is at that time disposed closely below the lower side of said uppermost bucket so that as said connection starts downward with said chain means, the bottom of the following bucket supports said flap and lifts the latter, as said following bucket also starts to swing in its change of direction, to propel the loose material resting on said flap into the uppermost bucket so that as said flap is pulled out from said bucket said material is gently deposited therein.

GLENN M. CRIGER.

REFERENCES CITED

The following references are of record in the file of this patent:

UNITED STATES PATENTS

| Number | Name | Date |
| --- | --- | --- |
| 612,297 | Wrightson | Oct. 11, 1898 |

FOREIGN PATENTS

| Number | Country | Date |
| --- | --- | --- |
| 569,475 | Germany | Feb. 20, 1933 |